(12) United States Patent
Mantere

(10) Patent No.: US 8,304,941 B2
(45) Date of Patent: Nov. 6, 2012

(54) ARRANGEMENT AND METHOD FOR COOLING AN ELECTRICAL MACHINE

(75) Inventor: Juhani Mantere, Tuusula (FI)

(73) Assignee: ABB Oy, Helsinki (FI)

( * ) Notice: Subject to any disclaimer, the term of this patent is extended or adjusted under 35 U.S.C. 154(b) by 414 days.

(21) Appl. No.: 12/728,709

(22) Filed: Mar. 22, 2010

(65) Prior Publication Data

US 2010/0237727 A1    Sep. 23, 2010

(30) Foreign Application Priority Data

Mar. 23, 2009   (EP) ..................................... 09155817

(51) Int. Cl.
*H02K 9/08* (2006.01)
(52) U.S. Cl. ................ 310/64; 310/52; 310/59
(58) Field of Classification Search .................... 310/52, 310/54, 57–59, 61, 60 A, 64
See application file for complete search history.

(56) References Cited

U.S. PATENT DOCUMENTS

| | | | | |
|---|---|---|---|---|
| 2,768,511 | A * | 10/1956 | Moody ............................ | 62/505 |
| 6,246,134 | B1 * | 6/2001 | Berrong et al. ................. | 310/52 |
| 7,122,923 | B2 * | 10/2006 | Lafontaine et al. ............. | 310/58 |
| 8,198,764 | B2 * | 6/2012 | Booth et al. .................... | 310/64 |
| 2002/0149273 | A1 * | 10/2002 | Soitu et al. ...................... | 310/58 |
| 2005/0194847 | A1 * | 9/2005 | Gromoll et al. ................. | 310/54 |
| 2007/0266727 | A1 * | 11/2007 | Bae et al. ........................ | 62/419 |

FOREIGN PATENT DOCUMENTS

| | | |
|---|---|---|
| DE | 196 36 591 A1 | 3/1998 |
| EP | 1 586 769 A2 | 10/2005 |
| GB | 1047602 A | 11/1966 |

OTHER PUBLICATIONS

European Search Report for EP 09155817.1 completed Feb. 19, 2010.

* cited by examiner

*Primary Examiner* — Quyen Leung
*Assistant Examiner* — Naishadh Desai
(74) *Attorney, Agent, or Firm* — Buchanan Ingersoll & Rooney PC

(57) ABSTRACT

An exemplary arrangement is disclosed for cooling an electrical machine having an external rotor rotating around its rotation axis and a stator having sheet packs, located inside the rotor at the end of an air gap. In the arrangement, a first part of a coolant flow is conducted from both ends of the stator through axial cooling channels into the stator sheet pack. A second part of the coolant flow is conducted from both ends of the stator into the air gap and from the air gap through at least one radial cooling channel into the stator sheet pack. Both parts of the coolant flow are conductable into at least one heat exchanger placed radially inside and at a distance from the stator sheet pack. At least one fan is placed radially inside the heat exchanger to send the first and the second part of the coolant flow to the ends of the stator.

11 Claims, 2 Drawing Sheets

ARRANGEMENT AND METHOD FOR COOLING AN ELECTRICAL MACHINE

SCOPE OF THE INVENTION

The object of the invention is an arrangement for cooling an electrical machine according to the preamble part of claim 1, and a method for cooling an electrical machine according to the preamble part of claim 11.

PRIOR ART

Electrical machines are cooled to remove the heat generated within them. Heat is mostly generated in the active part of the electrical machine, the stator and the rotor, by magnetic and resistance losses.

A known method for cooling a slow electrical machine with a large diameter and an external rotor has been presented in publication DE 19636591 A1. Outdoor air is used to cool the stator and the rotor. Fins have been formed on the outer surface of the external rotor to increase the cooling surface in contact with the outdoor air. Cooling channels have been formed below the stator core using cooling fins. Outdoor air flows through the cooling channels.

When using known methods to cool electrical machines with an external rotor, inadequate cooling power is a problem. Thermal dissipation levels must then be decreased, which will lead to increased size and weight of the machine. In addition, the interior of the electrical machine must be carefully sealed as the outdoor air used for cooling flows directly through the machine.

DESCRIPTION OF INVENTION

The purpose of the present invention is to create an efficient, low manufacturing cost arrangement for cooling an electrical machine and a method for cooling an electrical machine.

In order to achieve this, the invention is characterized by the features specified in the characteristics sections of Claims 1 and 11. Some other preferred embodiments of the invention have the characteristics specified in the dependent claims.

In an arrangement for cooling an electrical machine the electrical machine comprises an external rotor that rotates around its rotation axis and a stator located inside the rotor at the end of an air gap and comprising sheet packs. In the arrangement a first part of a coolant flow is conducted from both ends of the stator via axial cooling channels into the stator sheet pack. A second part of the coolant flow is conducted from both ends of the stator into the air gap and from the air gap further into the stator sheet pack via at least one radial cooling channel. Both parts of the coolant flow are conducted to at least one heat exchanger placed radially inside and at a distance from the stator sheet pack. At least one fan is placed radially inside the heat exchanger to send the first and the second part of the coolant flow to the ends of the stator.

In the method according to the invention for cooling an electrical machine, the electrical machine comprises an external rotor rotating around its rotation axis and a stator comprising sheet packs, located inside the rotor at the end of an air gap. A first part of the coolant flow is conducted into axial cooling channels from both ends of the stator. A second part of the coolant flow is conducted from both ends of the stator into the air gap and from the air gap into at least one radial cooling channel of the stator. Both coolant flows are conducted into the sheet packs and further into at least one heat exchanger placed radially inside and at a distance from the stator sheet pack. From the heat exchanger, coolant flows are conducted into at least one fan located below the heat exchanger in the radial direction, the fan sending the coolant flows to both ends of the stator.

In an embodiment of the invention, the axial cooling channel walls comprises a top and a bottom. The bottom is placed radially below the top. The top comprises inner surface of the stator.

In another embodiment of the invention, means for increasing a heat transfer surface in the axial cooling channel are attached or formed to the walls of the cooling channel. The means for increasing a heat transfer surface in the axial cooling channel can be attached or formed to the top of the channel, to the bottom of the channel or to the side walls of the channel All the walls can be covered with means for increasing a heat transfer surface at the same time or only some of them.

According to yet another embodiment of the invention, one wall of the axial cooling channel has fins incorporated into it. The wall may be created, for example, by attaching cooling profiles onto the inner surface of the stator.

According to a further embodiment of the invention, the axial cooling channel is formed by adding openings to the inner edge of the sheet pack.

The invention makes the cooling of an electrical machine more effective by sending coolant, such as air, into the air gap, between the stator core sections, between the sheet packs, and along the sheet packs. A solution according to the invention will not increase the outer dimensions of the electrical machine, and only has a minor effect on the weight of the electrical machine. Thus the heat exchanger has a compact shape.

The arrangement and method according to the invention are preferred for permanent-magnet electrical machines, such as a permanent-magnet motor or permanent-magnet generator. The air gap of multi-pole electrical machines with permanent magnets is small, making it difficult to send the entire amount of air required by the air cooling system through the air gap. When cooling air is only blown into the air gap, the pressure loss in the air circulation increases considerably.

The arrangement and method according to the invention are preferred for the cooling of electrical machines with a large diameter and slow rotating speed. In an electrical machine with a large diameter, there is space inside the stator. This space can be used in the arrangement and method according to the invention for arranging the coolant circulation and thermal exchange of the electrical machine. Such electrical machines can be used for example as wind power generators.

When the arrangement according to the invention is implemented using air, for example for a wind power generator, and outdoor air is used as the external coolant of the heat exchanger, no additional heat exchangers are needed. If the arrangement according to the invention is implemented using an air-to-liquid heat exchanger, another heat exchanger is needed to transfer the heat first transferred from the electrical machine to the liquid and further from the liquid to outdoor air, as the wind power generator is located in a high tower making the arrangement of liquid circulation difficult.

FIGURES

In the following, the invention will be described in more detail with the help of certain embodiments by referring to the enclosed drawings, where FIG. 1 is a partial illustration of the electrical machine's cross-section viewed from the side;

DETAILED DESCRIPTION

Figure 1:
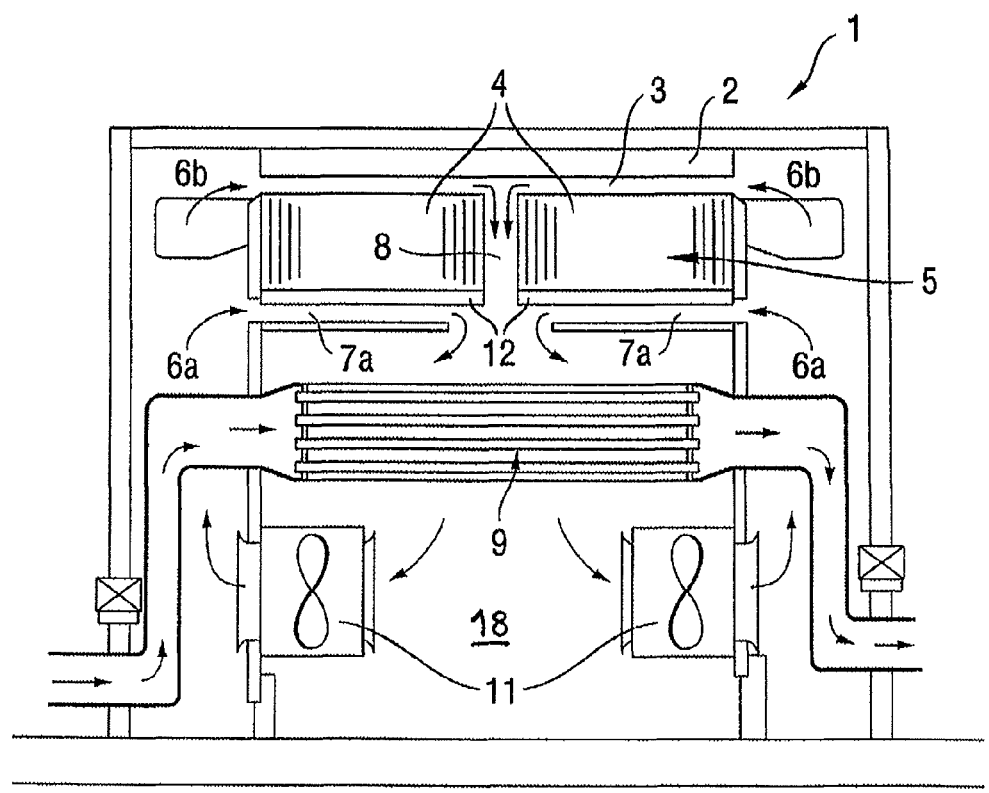

The electrical machine 1 illustrated in the Figures is a permanent-magnet motor or a permanent-magnet generator. The coolant is preferably gaseous, such as air or nitrogen.

FIGS. 1-4 illustrate the arrangement to cool an electrical machine. The electrical machine 1 has an external rotor 2 rotating around its rotation axis. The external rotor 2 is mainly cooled through its outer surface into outdoor air in a well-known way.

Inside the rotor there is a cylindrical stator 5 comprising sheet packs 4 at the end of an air gap 3. The stator 5 is annular and has a cylindrical inner circumference. The sheet packs 4 are arranged one after the other in the axial direction of the electrical machine 1 and comprise plates. Between the sheet packs 4 there are radial spacer members for separating the sheet packs 4. Thus radial ducts 8 are created between the sheet packs 4. The radial ducts 8 are open to the air gap 3 and to the inner circumference of the stator 5. The stator 5 is radially cooled by means of the radial ducts 8.

Figure 2:
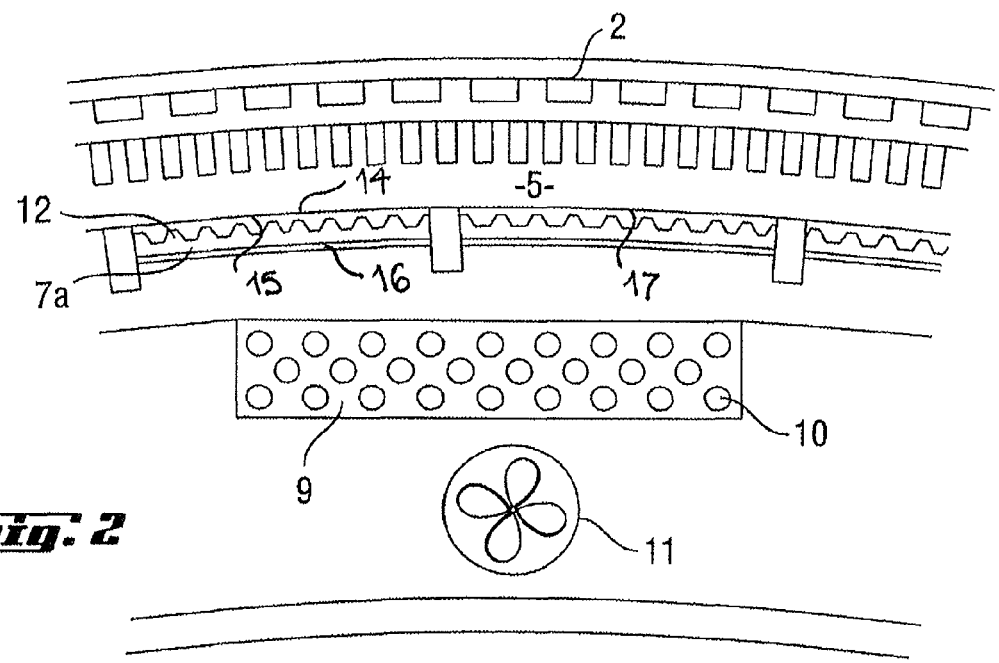
FIG. 2 is a partial illustration of the electrical machine's cross-section viewed from the end of the machine.

The cooling of the electrical machine is symmetrical. In a symmetrically cooled electrical machine, the flow of the coolant is introduced into both axial ends of the machine and removed at the middle of the machine In the electrical machine 1, coolant is conducted into the stator 5 and air gap 3 from both ends of the stator. In the Figures, coolant flows are illustrated with arrows. The first part of the coolant flow 6a is conducted into axial cooling channels 7a-b formed within the stator. To achieve even cooling, cooling channels have been formed over the entire length of the inner surface 17 of the stator 5. The axial cooling channel 7a comprises at least a top 15 and a bottom 16. In FIGS. 1 and 2 the top 15 of the axial cooling channel 7a is the cylindrical inner surface 17 of the stator 5.

Figure 3:
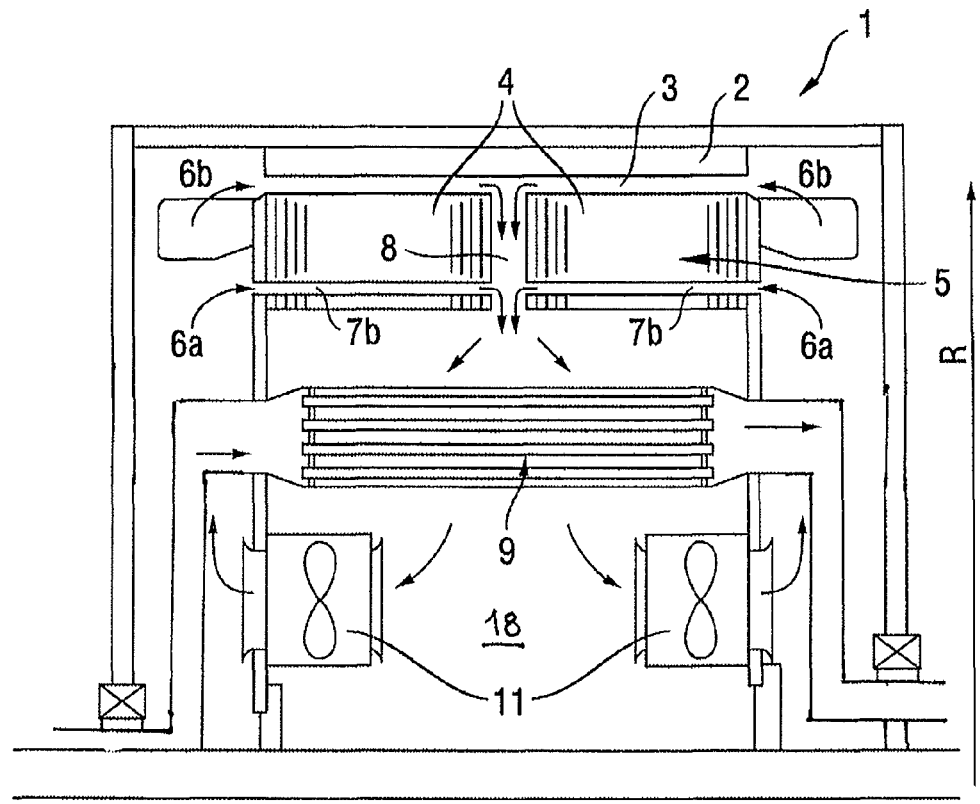
FIG. 3 is a partial illustration of the electrical machine's cross-section viewed from the side.

The second part of the coolant flow 6b is conducted from the stator ends into the air gap 3. In FIGS. 1 and 3, the stator 5 comprises two sheet packs 4. The air ducts 8 between the sheet packs are dimensioned to allow suitable air flow density. The coolant flows from both axial ends of the stator 5 to the centre of the stator 5 via the air gap 3. The air duct functions as a radial cooling channel 8, allowing the coolant to flow from the air gap 3 into the sheet packs 4, cooling the sheet packs 4 in the process. There may be several sheet packs 4 and cooling channels 8 formed between them.

In FIG. 1, the axial 7a and radial R cooling channel 8 open into the sheet pack 4. In FIG. 2, the axial channel 7b joins the radial R channel 8 that opens into the sheet pack 4. The first 6a and second 6b part of the coolant flow are conducted into the heat exchanger 9 placed radially inside and at a distance from the stator inner surface 17.

The heat exchanger assembly inside the stator is manufactured of several direct heat exchangers 9 arranged in a formation resembling a nut. It is advantageous if the axial length of the heat exchangers is substantially the axial length of the stator body as it increases the heat transfer surface in the heat exchangers. For clarity, the Figures only illustrate one heat exchanger. The heat exchanger 9 comprises tubes. All the heat exchangers 9 have a common shell 18. In the heat exchanger 9, the heat-exchanging surface 10 creates a closed channel for the external coolant flow, and on the other side of the heat-exchanging surface 10, the first 6a and the second 6b parts of the coolant flow are flowing towards the fan 11. The heat exchanger 9 is not in direct contact with the stator sheet pack 4, i.e. there is a distance between the stator inner surface 17 and the heat exchanger 9.

The stator 5 is cooled when it releases its heat into the coolant 6a-b circulating within the stator 5. The coolant 6a-b, in turn, releases the heat into the external coolant in the heat exchanger 9 assembly. The coolant is in direct contact with the heat-exchanging surface 10 of the heat exchanger 9.

There are two fans 11 placed radially inside the heat exchanger shell 18 to send the first 6a and second 6b parts of the coolant flow to both ends of the stator 5. If there is only one fan 11, it is preferable to place it radially inside the heat exchanger 9 at the centre of the heat exchanger 9.

The stator 5 has a closed coolant circulation. The external coolant circulation of the heat exchanger 9 may be open, partly closed or closed.

In the FIGS. 1-2 means for increasing a heat transfer surface in the axial cooling channel 7a are attached to the inner surface 17 of the stator 5.

In FIGS. 1-2, cooling profiles 12 are attached to the cooling channel's 7a top 15. The top 15 is the inner surface 17 of the stator 5. The fins of the cooling profiles 12 on the top 15 of the channel 7a increase the heat-exchanging surface and improve the heat exchange from the sheet packs 4 to the coolant. In the FIGS. 1 and 2 the bottom of the cooling channel 7a is comprised of sheet metal. The channel is sized to allow the speed of the coolant to increase in the channel, taking into account that part of the coolant also flows into the air gap.

The axial cooling channel's 7a top 15 equipped with fins can also be formed for example by making fins to the inner surface 17 of the sheet packs 4. Fins can be implemented by punching the sheets into the desired form.

Figure 4:
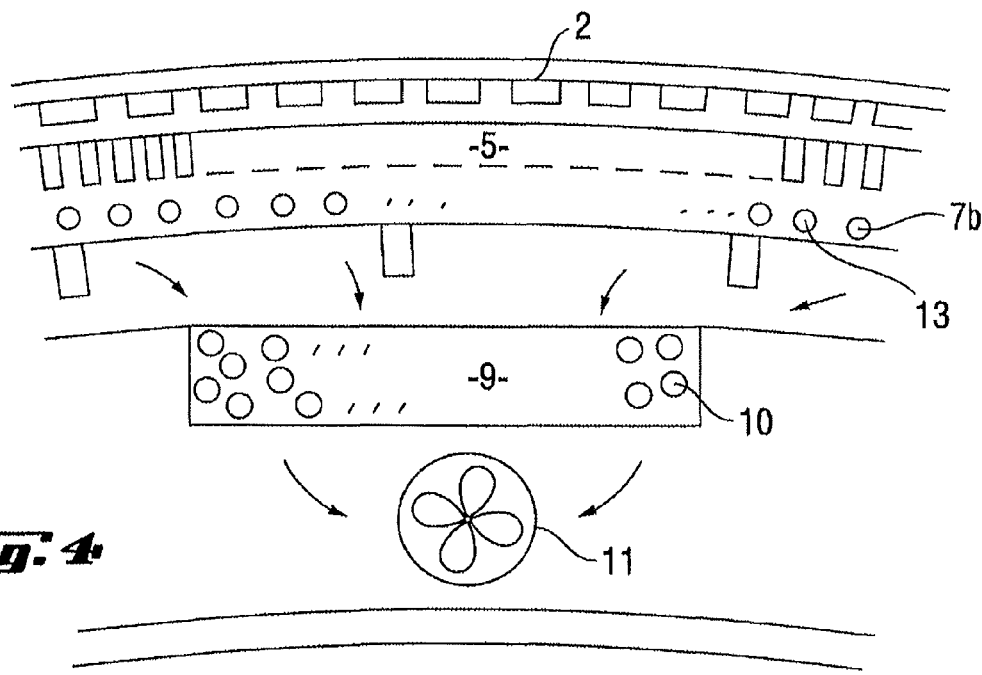
FIG. 4 is a partial illustration of the electrical machine's cross-section viewed from the end of the machine.

In FIGS. 3 and 4, axial cooling channels 7b are formed by adding openings 13 in the inner edge 14 of the sheet pack. Openings in the back of the sheet pack 4 form the cooling channel 7b from which the coolant flows from the end of the stator 5 into the sheet pack 4. When the cooling channel 7b joins the radial cooling channel 8, the coolant flows on into the sheet packs 4 via the radial cooling channel 8. At the same time, the openings 13 improve the cooling of the stator 5 as the openings 13 increase the cooling surface.

In FIGS. 1-4, the heat exchanger 9 is a tube heat exchanger, meaning that the heat-exchanging surface 10 comprises tubes. External coolant flows within the tubes, and, around the outer surface of the tubes flows the coolant from the stator 5 freely. The tubes have no direct contact with the sheet packs 4.

Heat exchanger can be, for example, an air-to-air heat exchanger, the coolant circulating within the electrical machine 1 being air and the external coolant of the heat exchanger 9 being outdoor air.

In the method for cooling an electrical machine, the cooling of the electrical machine is symmetrical. The first part of the coolant flow 6a is conducted from both ends of the stator into axial cooling channels 7a-b formed within the stator 5. The second part of the coolant flow 6b is conducted from both ends of the stator into the air gap 3. From the air gap 3, the coolant is conducted further into a radial cooling channel 8 of the stator 5, formed between two sheet packs 4. Both coolant flows 6a-b are conducted into the sheet packs 4 and further to the heat exchanger 9. In the heat exchanger 9, the coolant flows 6a-b cool while flowing freely on the heat-exchanging surface 10. From the heat exchanger 9, the coolant flows are directed into fans 11 located below the heat exchanger in the radial direction. The fans send the cooled coolant to both ends of the stator 5.

The arrangement and method for cooling an electrical machine are preferred for the cooling of electrical machines with a large diameter and slow rotating speed. In an electrical machine with a large diameter of 4 meters or more, there is space inside the sheet pack. This space is utilized in the arranging of coolant circulation and its heat exchange in the electrical machine.

Parts list: 1 electrical machine; 2 rotor; 3 air gap; 4 sheet pack; 5 stator; 6a-b coolant flow; 7a-b cooling channel; 8 radial cooling channel; 9 heat exchanger; 10 heat-exchanging surface; 11 fan, 12 cooling profile; 13 opening; 14 inner edge; 15 top; 16 bottom; 17 inner surface; 18 shell; R radial direction.

The invention claimed is:

1. An arrangement for cooling an electrical machine having an external rotor that rotates around its rotation axis, and a stator located inside the rotor at an end of an air gap and having a sheet pack, the arrangement comprising:
    axial cooling channels for conducting a first part of a coolant flow from both ends of the stator into the stator sheet pack; and
    at least one radial cooling channel for conducting a second part of the coolant flow from both ends of the stator into the air gap and from the air gap further into the sheet pack, wherein both parts of the coolant flow are conducted to at least one heat exchanger placed radially inside and at a distance from the stator sheet pack; and
    at least one fan placed radially inside the heat exchanger to send the first and the second part of the coolant flow to the ends of the stator.

2. An arrangement according to claim 1, wherein the axial cooling channel walls comprises:
    a top and a bottom, where the bottom is placed radially below the top, and the top comprises an inner surface of the stator.

3. An arrangement according to claim 2, comprising:
    means for increasing a heat transfer surface in the axial cooling channel a attached or formed to the walls of the cooling channel.

4. An arrangement according to claim 2, comprising:
    means for increasing a heat transfer surface in the axial cooling channel attached or formed to the inner surface of the stator.

5. An arrangement according to claim 3, wherein attached means for increasing a heat transfer surface are cooling profiles.

6. An arrangement according to claim 3, wherein formed means for increasing a heat transfer surface are fins.

7. An arrangement according to claim 1, wherein the axial cooling channel is formed by adding openings in the inner edge of the sheet pack.

8. An arrangement according to claim 1, wherein the heat-exchanging surface of the heat exchanger comprises tubes.

9. An arrangement according to claim 1, wherein the heat exchanger is an air-to-air heat exchanger.

10. An arrangement according to claim 1, wherein the electrical machine is a permanent-magnet motor or permanent-magnet generator.

11. A method for cooling an electrical machine having an external rotor rotating around its rotation axis and a stator located inside the rotor at an end of an air gap and having a sheet pack, the method comprising:
    conducting a first part of coolant flow from both ends of the stator into axial cooling channels; and
    conducting a second part of the coolant flow from both ends of the stator into the air gap and from the air gap further into at least one radial cooling channel of the stator, wherein both coolant flows are conducted into the sheet pack and further into at least one heat exchanger placed radially inside and at a distance from the stator sheet pack, and from which heat exchanger the coolant flows are conducted into at least one fan located below the heat exchanger in the radial direction, the fan sending the coolant flows to both ends of the stator.

* * * * *